US 12,435,508 B2

(12) United States Patent
Lolley

(10) Patent No.: US 12,435,508 B2
(45) Date of Patent: Oct. 7, 2025

(54) SOUND-DEADENING DRAINAGE MAT

(71) Applicant: Advanced Building Products, Inc., Sanford, ME (US)

(72) Inventor: Keith A. Lolley, Sanford, ME (US)

(73) Assignee: Advanced Building Products, Inc., Sanford, ME (US)

( * ) Notice: Subject to any disclaimer, the term of this patent is extended or adjusted under 35 U.S.C. 154(b) by 352 days.

(21) Appl. No.: 17/731,838

(22) Filed: Apr. 28, 2022

(65) Prior Publication Data
US 2022/0356700 A1 Nov. 10, 2022

Related U.S. Application Data

(60) Provisional application No. 63/184,257, filed on May 5, 2021.

(51) Int. Cl.
*E04B 1/70* (2006.01)
*E04B 1/90* (2006.01)

(52) U.S. Cl.
CPC .............. *E04B 1/7038* (2013.01); *E04B 1/90* (2013.01)

(58) Field of Classification Search
CPC .......... E04B 1/7038; E04B 1/90; E04B 1/625
See application file for complete search history.

(56) References Cited

U.S. PATENT DOCUMENTS

| 5,598,673 | A | 2/1997 | Atkins |
| 6,550,212 | B2* | 4/2003 | Lubker, II .............. D06N 3/125 52/302.1 |
| 6,804,922 | B1 | 10/2004 | Egan |
| 6,869,901 | B2* | 3/2005 | Lubker, II ................. B32B 5/26 52/302.1 |
| 7,096,630 | B1 | 8/2006 | Keene et al. |
| 7,807,011 | B2 | 10/2010 | Dunstan et al. |
| 8,146,310 | B2 | 4/2012 | Keene |

(Continued)

FOREIGN PATENT DOCUMENTS

EP 3797986 A1 * 3/2021 ........... B32B 15/046

OTHER PUBLICATIONS

GCP Applied Technologies, Inc., Cambridge, MA; VYCOR® enV-S™ Product Data Sheet.

(Continued)

*Primary Examiner* — Rodney Mintz
(74) *Attorney, Agent, or Firm* — Pierce Atwood LLP

(57) ABSTRACT

A method for reducing sound transmission through a building wall includes placing a sound-deadening and/or thermally insulative drainage mat between an exterior wall cladding and an interior framing system. The sound-deadening and/or thermally insulative drainage mat including: a water or moisture permeable filter layer, an entangled net adjacent and joined to the filter layer, and a sound-deadening and/or thermally insulative layer adjacent and joined to the entangled net opposite the filter layer. The filter layer is placed adjacent the exterior wall cladding and the sound-deadening and/or thermally insulative layer is placed adjacent the framing system. The sound-deadening and/or thermally insulative layer is a fabric. Water or moisture within the wall is drained out of the wall via the entangled net and sound penetrating the exterior wall cladding is reduced or eliminated by the sound-deadening and/or thermally insulative layer.

15 Claims, 2 Drawing Sheets

(56) References Cited

U.S. PATENT DOCUMENTS

| | | |
|---|---|---|
| 8,528,286 B2 | 9/2013 | Keene |
| 8,544,218 B2 | 10/2013 | Dellinger et al. |
| 8,596,004 B2 | 12/2013 | Coulton et al. |
| 9,528,279 B2 * | 12/2016 | Roy .................. B32B 27/12 |
| 9,657,474 B2 | 5/2017 | Groft et al. |
| 9,783,980 B2 | 10/2017 | Snyder et al. |
| 9,816,264 B2 | 11/2017 | Jablonka |
| 9,988,819 B2 * | 6/2018 | Keene .................. E04D 13/172 |
| 10,125,489 B2 | 11/2018 | Snyder |
| 10,538,912 B2 * | 1/2020 | Roy .................. E04B 1/84 |
| 12,123,158 B2 * | 10/2024 | Lolley .................. B32B 5/245 |
| 2002/0146953 A1 * | 10/2002 | Lubker, II .................. B32B 5/12 |
| | | 442/187 |
| 2003/0022578 A1 * | 1/2003 | Lubker, II .................. B32B 27/34 |
| | | 428/141 |
| 2006/0230699 A1 | 10/2006 | Keene |
| 2008/0163586 A1 * | 7/2008 | Goulet .................. E04C 2/243 |
| | | 52/794.1 |
| 2009/0007508 A1 * | 1/2009 | Dunstan .................. E04B 1/70 |
| | | 52/302.1 |
| 2009/0242325 A1 * | 10/2009 | Dellinger .................. E04B 1/84 |
| | | 181/290 |
| 2010/0229486 A1 * | 9/2010 | Keene .................. E04F 15/182 |
| | | 52/309.1 |
| 2011/0107700 A1 * | 5/2011 | Keene .................. B32B 5/26 |
| | | 181/294 |
| 2013/0139457 A1 * | 6/2013 | Coulton .................. E04B 1/66 |
| | | 52/409 |
| 2015/0037548 A1 * | 2/2015 | Jablonka .................. E04B 1/625 |
| | | 156/291 |
| 2016/0002914 A1 * | 1/2016 | Snyder .................. E04D 11/02 |
| | | 52/309.1 |
| 2016/0090745 A1 * | 3/2016 | Roy .................. B32B 5/028 |
| | | 156/60 |
| 2016/0101588 A1 * | 4/2016 | Groft .................. B32B 27/12 |
| | | 428/137 |
| 2016/0177574 A1 * | 6/2016 | Keene .................. E04D 13/178 |
| | | 52/302.3 |
| 2018/0066427 A1 * | 3/2018 | Snyder .................. B32B 5/26 |
| 2018/0087267 A1 * | 3/2018 | Roy .................. B32B 27/34 |
| 2022/0170262 A1 * | 6/2022 | Lolley .................. E04B 1/625 |
| 2022/0251798 A1 * | 8/2022 | Lolley .................. E04B 1/80 |

OTHER PUBLICATIONS

Functional Coatings LLC, Newburyport, MA; Permeable Self-adhered Air Barrier Membrane Product Data Sheet.
CA Office Action, dated Aug. 30, 2023.

* cited by examiner

SOUND-DEADENING DRAINAGE MAT

RELATED APPLICATION

This application claims the benefit of U.S. Provisional Patent Application No. 63/184,257 filed May 5, 2021, incorporated herein by reference.

FIELD OF THE INVENTION

The invention is directed to budding construction, such as a wall design and including a component with sound-deadening and/or thermal insulative properties used in the wall design having a non-traditional exterior cladding.

BACKGROUND

New building wall designs are being considered for commercial/residential building code approval. These new wall designs utilize exterior claddings such as metal, cementitious materials (e.g., fiber cement cladding), terra cotta, and other non-traditional materials (such non-traditional materials exclude traditional materials such as wood, brick, stucco, and stone). These new wall designs also call for a rainscreen assembly. The rainscreen assembly allows moisture/water to escape by draining down the wall and keeps the interior of the wall dry with ventilation up through the wall, for example, the drainage passage. One rainscreen product commercially available is MORTAIRVENT® rainscreen offered by Advance Building Products, Inc. of Sanford, ME. MORTAIRVENT rainscreen is an engineered drainage and ventilation mat used to perform the rainscreen function in wall systems for commercial and residential sectors.

The new wall systems, with the move away from traditional cladding (e.g., wood, brick, stucco, and stone) lose the noise deadening and insulative properties of these traditional claddings/materials. To replace those lost properties, new rainscreen materials can be provided.

The sound-deadening drainage mat discussed hereinafter addresses, in part, the foregoing needs.

SUMMARY OF THE INVENTION

A method for reducing sound transmission through a building wall includes placing a sound-deadening and/or thermally insulative drainage mat between an exterior wall cladding and an interior framing system. The sound-deadening and/or thermally insulative drainage mat including: a water or moisture permeable filter layer, an entangled net adjacent and joined to the filter layer, and a sound-deadening and/or thermally insulative layer adjacent and joined to the entangled net opposite the filter layer. The filter layer is placed adjacent the exterior wall cladding and the sound-deadening and/or thermally insulative layer is placed adjacent the framing system. The sound-deadening and/or thermally insulative layer is a fabric. Water or moisture within the wall is drained out of the wall via the entangled net and sound penetrating the exterior wall cladding is reduced or eliminated by the sound-deadening and/or thermally insulative layer.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DESCRIPTION OF THE INVENTION

Figure 1:
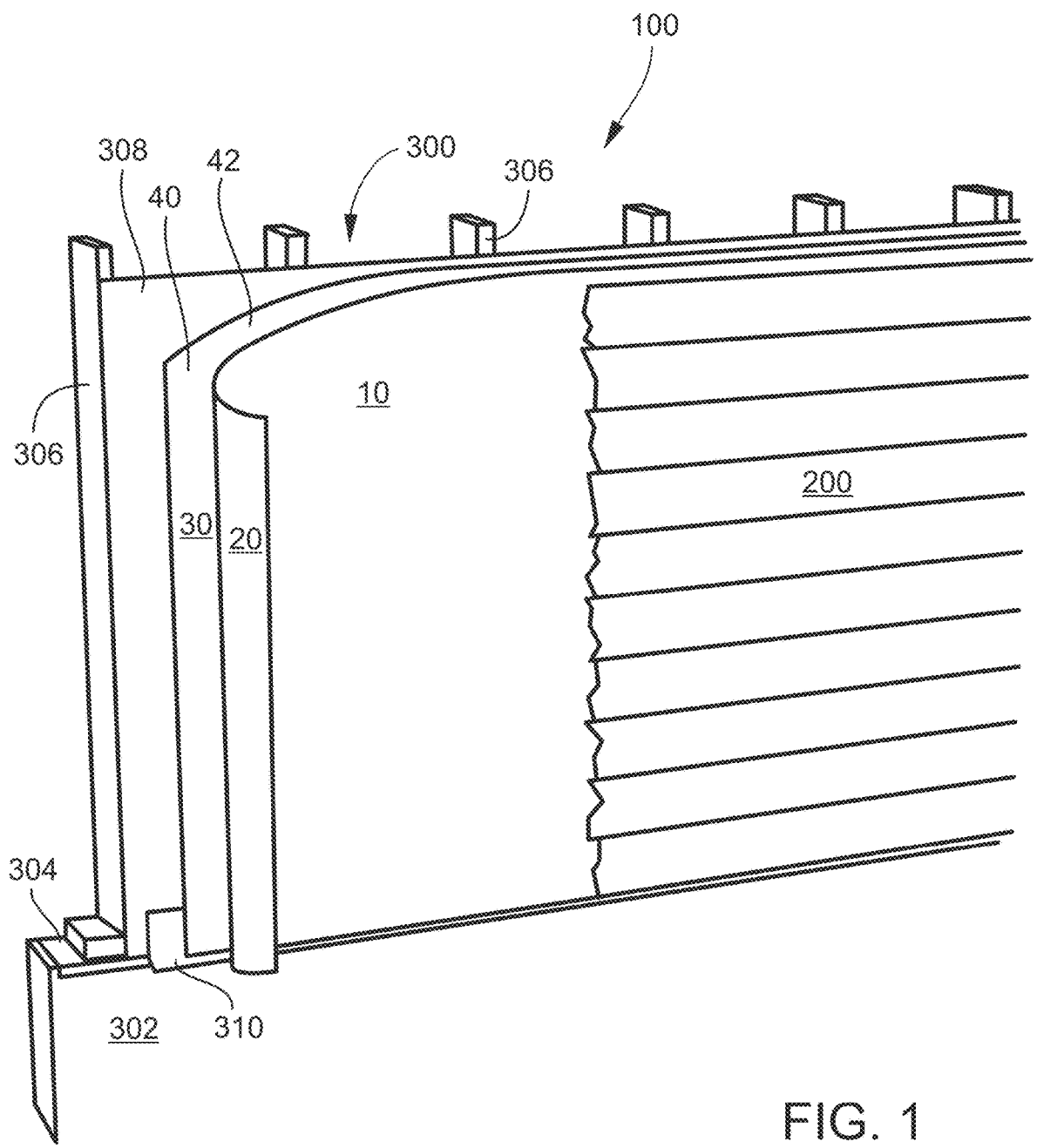
FIG. 1 is an illustration of an embodiment of the invention in use in a wall system.

The invention is directed to a sound-deadening and/or thermally insulative drainage mat and a method for reducing sound transmission and/or thermal transmission through a wall including, for example, non-traditional materials. An embodiment of the sound-deadening and/or thermally insulative drainage mat 10 is illustrated in FIG. 1. FIG. 1 illustrates an embodiment of a wall system 100 with mat 10 located within that wall system 100. For example, mat 10 may be placed between an exterior wall cladding 200 and an interior framing system 300.

The exterior wall cladding 200 includes, among other things: metal, plastic, cementitious materials (e.g., fiber cement cladding), terra cotta, and other non-traditional materials. Traditional material include: wood, brick, stucco, stone, and/or combinations thereof. In some embodiments, traditional materials are excluded from non-traditional materials (or traditional materials are not non-traditional materials).

The interior framing system 300 includes, among other things: wooden studs, metal studs, and/or concrete masonry units (CMU). The framing system 300 generally may include: a foundation 302, a barrier material 304 (separating the foundation from studding), studding 306, an exterior sheathing 308, and water/moisture diverter 310.

The mat 10 includes: a water or moisture permeable filter layer 20, an entangled net 30 adjacent and joined to the filter layer 20, and a sound-deadening and/or thermally insulative layer 40 adjacent and joined to the entangled net 30 opposite the filter layer 20. The filter layer 20 is placed adjacent the exterior wall cladding 200 and the sound-deadening layer is and/or thermally insulative placed adjacent the framing system 200. The filter layer 20, the entangled net 30, and the sound-deadening and/or thermally insulative layer 40 are co-extensive. When water or moisture is within the wall 100, it is drained out of the wall via the entangled net and sound penetrating and/or heat escaping the non-traditional wall cladding 200 is reduced or eliminated by the layer 40.

The water or moisture permeable filter layer 20 is non-woven and/or a perforated film. The filter layer 20 limits the intrusion of moisture (water), but is also breathable. It is inevitable that some moisture will enter the building, so this barrier is breathable to allow moisture to escape. The filter layer 20 may be made from thermoplastics and may be in the form of, for example, a spunbond nonwoven, meltblown nonwoven, and/or a combination of meltblown and spunbond nonwovens. These thermoplastic materials may include: polypropylene, nylon (e.g., nylon 6), and/or polyethylene (e.g., HDPE). The filter layer 20 may be a coated membrane with enhanced air and water vapor permeance and water resistance. The filter layer 20 may be commercially available from, for example: GCP Applied Technologies, Inc. of Cambridge, MA as VYCOR® enV-S™, Product Data Sheet incorporated herein by reference; and Functional Coatings LLC of Newburyport, MA as 'Permeable Self-adhered Air Barrier Membrane,' Product Data Sheet incorporated herein by reference.

Figure 2:
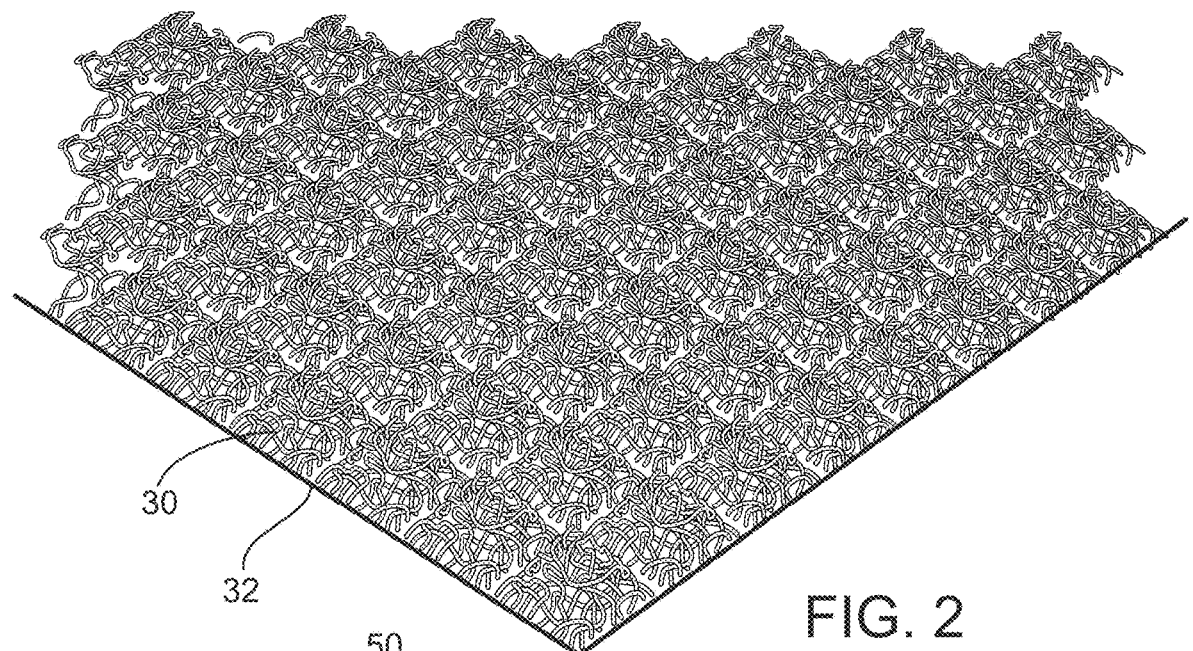
FIG. 2 is an illustration of an embodiment of an entangled net.

The entangled net 30 may have any thickness. Exemplary thicknesses include thicknesses of 3 mm (0.11811 inches), 6 mm (~0.23622 inches), 10 mm (~0.393701 inches), 20 mm (~0.787402 inches), and 40 mm (~1.5748 inches) (and values therebetween). The entangled net is made of strands 32 (large diameter filaments) extruded from a thermoplastic material including, among other materials, polyolefin (e.g., polypropylene) and/or polyamides (e.g., nylon). This entangled net facilitates movement of moisture (water) within the product, so that moisture (water) may escape, for example, through drains or vents, e.g., weep holes (conventional and not shown), in a lower part of the building wall. Entangled nets are known and may be in either of two general forms: 1) a solid formed of a plurality of entangled fibers (filaments or continuous fibers), for example see U.S. Pat. Nos. 7,096,630, 8,146,310, and 8,544,218 (such as a scrubbing pad); or 2) a sheet of entangled fibers (filaments or continuous fibers) where the sheet is molded or folded (e.g., forming, for example, a sine curve (or corn rows) in cross-section (also referred to as 'channels'), or 'peaks and furrows' (or 'W')) (also referred to as 'channels'), or dimpled or waffle (e.g., cone-shaped, pyramidal-shaped including truncated cones or pyramids, for example see FIG. 2—truncated pyramids). To create the entangled net, a three-dimensional solid, see for example, U.S. Pat. No. 8,528,286, incorporated herein by reference. Entangled nets are known, for example see U.S. Pat. No. 7,096,630, US2006/0230699; U.S. Pat. Nos. 8,146,310; 8,544,218; and 8,528,286, each incorporated herein by reference. In general, the fibers of the entangled net create an open solid (open in the sense of the interstitial spaces between the fibers). The entangled net 30 may be made of thermoplastic materials. These thermoplastic materials may includes: polypropylene, nylon (e.g., nylon 6), and/or polyethylene (e.g., HDPE). The drainage structure may have a thickness in the range of about 3-20 mm (0.11811-0.787402 inches) (including all subsets of the range).

Figure 3:
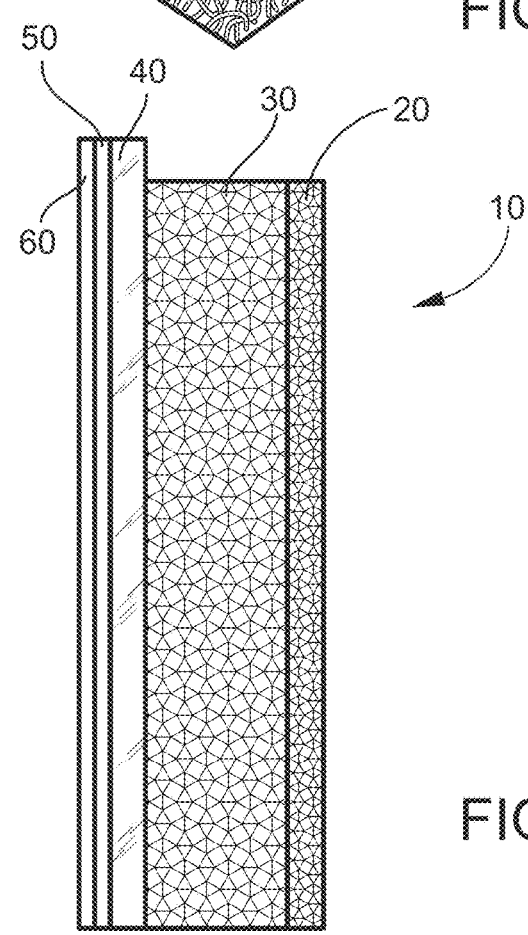
FIG. 3 is a cross-sectional view of an embodiment of the invention.

The layer 40 may be a fabric including sound-deadening fibers and/or thermally transmissive resistant fibers (fibers that increase the R-value of the fabric). The layer 40 may be a single layered fabric with a mixture of fibers including sound-deadening fibers and/or thermally transmissive resistant fibers, or a multilayered fabric where some or all of the layers include sound-deadening fibers and/or thermally transmissive resistant fibers The fabric may be a nonwoven. In one embodiment, the layer 40 includes a flap 42 extending beyond one edge of the entangled net 30, see FIGS. 1 and 3. This flap 42 facilitates installation of the mat 10 by providing an alignment guide during the layout of the mat 10, and may eliminates an open seam between adjacently placed mat 10.

Additionally, mat 10 may include an adhesive layer 50. Adhesive layer 50 may be a plurality of adhesive strips and/or scatter coated over the layer 40 (to adhere to the framing system 300. The adhesive may be any adhesive. In one embodiment, the adhesive is a pressure sensitive adhesive (PSA). These PSAs may be produced using latexes synthesized via a starved seeded semi-batch emulsion polymerization process with butyl acrylate (BA), methyl methacrylate (MMA) and sometimes additional monomers, 2-hydroxy ethyl methacrylate (HEMA) and/or acrylic acid (AA). In an embodiment, the PSA is based on acrylic and/or butyl polymers. In another embodiment, the adhesive may have a pull adhesion, ASTM D4541, in a range of about 10-21 psi, in another embodiment in a range of about 14-18 psi, in yet another embodiment in a range of about 16 psi (including all subsets of the ranges). The adhesive, in some embodiments, may have a peel adhesion (ASTM D3330 Method F), in a range of about 2-7 lbf/in, in another embodiment in a range of about 2.5-6.0 lbf/in, and in yet another embodiment in a range of about 3-5.5 lbf/in (including all subsets of the ranges). The adhesive need not cover the entire (100%) of the resistant layer 40. In some embodiments, the adhesive covers about 50-90% of the surface of the resistant layer 40. In other embodiments, the adhesive covers about 40-95% of that surface or about 60-85% of that surface (including all subsets of those ranges).

Additionally, a release layer 60 has a silicone surfaced adjacent the adhesive layer 50. In one embodiment, the release layer 60 may be 'split.' For example, in the horizontal layout, the release layer 60 may be split into an upper portion and lower portion, so that in installation the upper portion may be adhered first (to ensure proper alignment) and then the lower portion adhered with final positioning.

The present invention may be embodied in other forms without departing from the spirit and the essential attributes thereof, and, accordingly, reference should be made to the appended claims, rather than to the foregoing specification, as indicating the scope of the invention.

I claim:

1. A sound-deadening drainage mat, comprising:
a water permeable filter layer;
an entangled net adjacent and joined to the water permeable filter layer, the entangled net having interstitial spaces therein configured and arranged to allow liquid to flow therethrough;
a sound-deadening layer adjacent and joined to the entangled net opposite the water permeable filter layer, the sound-deadening layer configured to reduce or eliminate sound that penetrates an exterior wall cladding;
an adhesive layer coupled to the sound-deadening layer opposite the entangled net, the adhesive layer configured to secure the sound-deadening drainage mat to an interior framing system of a building wall; and
a release layer releasably coupled to the adhesive layer, the release layer configured to be removed prior to placing the sound-deadening drainage mat between the exterior wall cladding and the interior framing system of the building wall;
wherein:
the water permeable filter layer is oriented adjacent the exterior wall cladding,
the sound-deadening layer is oriented adjacent the interior framing system of the building wall,
the entangled net is oriented to allow water to flow through a region between the water permeable filter layer and the sound-deadening layer, and
the water permeable filter layer, the entangled net, and the sound-deadening layer are co-extensive.

2. The sound-deadening drainage mat of claim 1, wherein the exterior wall cladding includes at least one of metal, cementitious materials, or terra cotta.

3. The sound-deadening drainage mat of claim 1, wherein the interior framing system includes at least one of wooden studs, metal studs, or concrete masonry units.

4. The sound-deadening drainage mat of claim 1, wherein the adhesive layer comprises a first adhesive strip and a second adhesive strip.

5. The sound-deadening drainage mat of claim 1, wherein the sound-deadening layer includes a perforated film.

6. The sound-deadening drainage mat of claim 1, wherein the sound-deadening layer includes a fabric.

7. The sound-deadening drainage mat of claim 6, wherein the fabric is nonwoven.

8. A sound-deadening drainage mat, consisting of:

a water permeable filter layer;

an entangled net adjacent and joined to the water permeable filter layer, the entangled net having interstitial spaces therein configured and arranged to allow liquid to flow therethrough; and a sound-deadening layer adjacent and joined to the entangled net opposite the water permeable filter layer, the sound-deadening layer configured to reduce or eliminate sound that penetrates an exterior wall cladding;

wherein:
the water permeable filter layer is oriented adjacent the exterior wall cladding,
the sound-deadening layer is oriented adjacent an interior framing system of a building wall, and
the entangled net is oriented to allow water to flow through a region between the water permeable filter layer and the sound-deadening layer.

9. A method, comprising:

placing a sound-deadening drainage mat between an exterior wall cladding and an interior framing system of a building wall, the sound-deadening drainage mat including:

a water permeable filter layer, an entangled net adjacent and joined to the water permeable filter layer, the entangled net having interstitial spaces therein configured and arranged to allow liquid to flow therethrough, a sound-deadening layer adjacent and joined to the entangled net opposite the water permeable filter layer, the sound-deadening layer configured to reduce or eliminate sound that penetrates the exterior wall cladding, an adhesive layer coupled to the sound-deadening layer opposite the entangled net, the adhesive layer configured to secure the sound-deadening drainage mat to the interior framing system, and a release layer releasably coupled to the adhesive layer, the release layer configured to be removed prior to placing the sound-deadening drainage mat between the exterior wall cladding and the interior framing system of the building wall;

wherein:
the water permeable filter layer is oriented adjacent the exterior wall cladding,
the sound-deadening layer is oriented adjacent the interior framing system,
the entangled net is oriented to allow water to flow through a region between the water permeable filter layer and the sound-deadening layer, and
the water permeable filter layer, the entangled net, and the sound-deadening layer are co-extensive.

10. The method of claim 1, wherein the exterior wall cladding includes at least one of metal, cementitious materials, or terra cotta.

11. The method of claim 1, wherein the interior framing system includes at least one of wooden studs, metal studs, or concrete masonry units.

12. The method of claim 9, wherein the adhesive layer comprises a first adhesive strip and a second adhesive strip.

13. The method of claim 9, wherein the sound-deadening layer includes a perforated film.

14. The method of claim 9, wherein the sound-deadening layer includes a fabric.

15. The method of claim 14, wherein the fabric is nonwoven.

* * * * *